(12) United States Patent
Boughton et al.

(10) Patent No.: US 9,061,928 B2
(45) Date of Patent: Jun. 23, 2015

(54) ULTRASONIC TRANSDUCER ASSEMBLY FOR APPLYING ULTRASONIC ACOUSTIC ENERGY TO A GLASS MELT

(75) Inventors: Daniel Robert Boughton, Rushville, NY (US); Scott Michael Jarvis, Ithaca, NY (US); Jonghak Kim, Corning, NY (US); Zhiqiang Shi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1114 days.

(21) Appl. No.: 13/036,568

(22) Filed: Feb. 28, 2011

(65) Prior Publication Data

US 2012/0216576 A1 Aug. 30, 2012

(51) Int. Cl.
*B01F 11/02* (2006.01)
*C03B 5/18* (2006.01)
*C03B 5/225* (2006.01)

(52) U.S. Cl.
CPC ............... *C03B 5/18* (2013.01); *B01F 11/0258* (2013.01); *C03B 5/225* (2013.01)

(58) Field of Classification Search
CPC .................................................. B01F 11/0258
USPC ........................................... 366/127; 65/178
See application file for complete search history.

(56) References Cited

U.S. PATENT DOCUMENTS

| | | |
|---|---|---|
| 2,569,459 A | 10/1951 | De Voe |
| 2,635,388 A | 4/1953 | Peyches et al. |
| 2,762,167 A | 9/1956 | De Voe |
| 4,261,197 A | 4/1981 | Mansfield |
| 4,316,734 A | 2/1982 | Spinosa et al. |

(Continued)

FOREIGN PATENT DOCUMENTS

| | | |
|---|---|---|
| CN | 2740275 | 11/2005 |
| CN | 1802874 | 12/2014 |

(Continued)

OTHER PUBLICATIONS

PCT Search Report and Written Opinion issued on Sep. 19, 2012, in corresponding PCT Application No. PCT/US2012/026679, filed Feb. 27, 2012.

(Continued)

*Primary Examiner* — Charles Cooley
*Assistant Examiner* — Marc C Howell
(74) *Attorney, Agent, or Firm* — Michael A. Hood

(57) ABSTRACT

An ultrasonic transducer assembly includes an ultrasonic transducer, an ultrasonic booster, an ultrasonic probe, and a booster cooling unit. The ultrasonic booster is connected to the ultrasonic transducer to amplify acoustic energy generated by the ultrasonic transducer and transfer the amplified acoustic energy to the ultrasonic probe. A seated end of the ultrasonic probe is positioned in a probe seat of the ultrasonic booster. The booster cooling unit is positioned to regulate the temperature of the probe seat of the ultrasonic booster such that the assembly supports a temperature dependent press-fit engagement of the seated end of the ultrasonic probe and the probe seat of the ultrasonic booster. The temperature dependent press-fit engagement is such that the seated end of the ultrasonic probe can be reversibly moved in and out of the probe seat at an elevated temperature $T_{HOT}$ and is fixed in the probe seat at room temperature $T_{COLD}$.

14 Claims, 4 Drawing Sheets

(56) References Cited

U.S. PATENT DOCUMENTS

| | | | |
|---|---|---|---|
| 4,316,735 | A | 2/1982 | Schultz et al. |
| 4,398,925 | A | 8/1983 | Trinh et al. |
| 4,433,399 | A | 2/1984 | Massa |
| 4,549,896 | A | 10/1985 | Streicher et al. |
| 4,770,699 | A | 9/1988 | Mountford |
| 5,934,043 | A * | 8/1999 | Aindow et al. ............... 53/371.4 |
| 6,795,484 | B1 | 9/2004 | Huber et al. |
| 8,490,433 | B2 * | 7/2013 | Boughton et al. ........... 65/135.6 |
| 2003/0101750 | A1 | 6/2003 | Goller et al. |
| 2004/0053550 | A1 | 3/2004 | Arai |
| 2004/0190733 | A1 | 9/2004 | Nayar et al. |
| 2008/0018997 | A1 | 1/2008 | Kawazu et al. |
| 2008/0237299 | A1 | 10/2008 | Vogler et al. |
| 2008/0238262 | A1 * | 10/2008 | Takeuchi et al. .............. 310/346 |
| 2009/0088646 | A1 * | 4/2009 | Nagano et al. ................ 600/463 |
| 2009/0224443 | A1 * | 9/2009 | Rundquist et al. .............. 266/99 |
| 2010/0218608 | A1 * | 9/2010 | Eckert et al. .................... 73/584 |

FOREIGN PATENT DOCUMENTS

| | | |
|---|---|---|
| WO | WO2004/095883 | 11/2004 |
| WO | 2008/018996 | 2/2008 |

OTHER PUBLICATIONS

PCT Invitation to Pay Additional Fees and Communication Relating to the Results of the Partial International Search, issued on Jun. 6, 2012, in corresponding PCT Application No. PCT/US2012/026679.

G.I. Eskin, "Cavitation mechanism of ultrasonic melt degassing", Ultrasonics Sonochemistry, vol. 2, No. 2, pp. S137-S141, 1995.

Suzuki et al., "Impedance Characteristic of Ultrasonic Transducer Operated as Load of MOS-FET DC-To-RF Power Inverter", IEEE, pp. 987-990, 1996.

Lis et al., "Measuring the Impedance of Ultrasonic Transducers", Proceedings of the XXI Symposium of Hydroacoustics, vol. 7, pp. 143-148, 200, Gdynia 2004.

"Ultrasonic Transducers and Generators" FinnSonic, Addicted to Cleanliness, http://www.finnsonic.com/index.php?option=com_content&view=artiele&id=14&Itemid=, 2010.

UCE Ultrasonic Co. Ltd. "Ultrasonic Transducer Circuit", Product Catalogue, http://www.ultra-piezo.com/2010/0801/59.html, 2010.

Hoffelner et al.; "Numerical simulation of nonlinear wave propagation in thermoviscous fluids including dissipation"; 1999 IEEE Ultrasonics Symposium, 513-516.

Chinese Office Action, dated Jan. 23, 2015, pp. 1-11, Chinese Application No. 201280020771.6, The State Intellectual Property Office of The People's Republic of China, China.

* cited by examiner

ULTRASONIC TRANSDUCER ASSEMBLY FOR APPLYING ULTRASONIC ACOUSTIC ENERGY TO A GLASS MELT

BACKGROUND

1. Field

The present disclosure relates to glass manufacturing processes and systems including, but not limited to, glass mixing, homogenization, fining, or any process or system where the introduction of mechanical energy to the glass melt might be advantageous.

2. Technical Background

Mechanical stirrers are commonly employed to introduce mechanical energy to a glass melt. We have recognized that mechanical stirrers can, under some conditions, be a source of contamination in a glass melt.

BRIEF SUMMARY

In accordance with one embodiment of the present disclosure, a method of applying ultrasonic acoustic energy to a glass melt by monitoring a glass melt temperature $T_Y$ and transferring ultrasonic acoustic energy from an ultrasonic transducer to the glass melt at a controller power $P_C$ and a controller frequency $v_C$ through an ultrasonic probe positioned in the glass melt is provided. According to the method, the controller power $P_C$ is controlled in response to at least (i) the monitored glass melt temperature $T_Y$ and (ii) a reference glass melt temperature $T_R$. The controller frequency $v_C$ is controlled in response to at least (i) one or more input parameters from a temperature-viscosity curve characterizing the glass melt, (ii) one or more input parameters from one or more temperature dependent impedance response models of the glass melt, and (iii) $\Delta Z$, where $\Delta Z$ represents a degree to which an impedance condition $Z_Y$ of the ultrasonic probe differs from a reference impedance $Z_R$ when the ultrasonic probe is positioned in the glass melt. Systems for applying ultrasonic acoustic energy to glass melts are also contemplated.

In accordance with another embodiment of the present disclosure, an ultrasonic transducer assembly is provided comprising an ultrasonic transducer, an ultrasonic booster, an ultrasonic probe, and a booster cooling unit. The ultrasonic booster is connected to the ultrasonic transducer to amplify acoustic energy generated by the ultrasonic transducer and transfer the amplified acoustic energy to the ultrasonic probe. A seated end of the ultrasonic probe is positioned in a probe seat of the ultrasonic booster. The booster cooling unit is positioned to regulate the temperature of the probe seat of the ultrasonic booster such that the assembly supports a temperature dependent press-fit engagement of the seated end of the ultrasonic probe and the probe seat of the ultrasonic booster. The temperature dependent press-fit engagement is such that the seated end of the ultrasonic probe can be reversibly moved in and out of the probe seat at an elevated temperature $T_{HOT}$ and is fixed in the probe seat at room temperature $T_{COLD}$.

We contemplate that the ultrasonic processes and systems disclosed herein will help address the potential source of contamination introduced by known mechanical stirrers. In addition, we have recognized that the use of ultrasonic energy may be advantageous in glass fining operations because ultrasonic energy can encourage the coalescence of bubbles, allowing for Stokes fining, and can encourage acoustic streaming, where gas bubbles move toward the glass air interface. Finally, we contemplate that the ultrasonic processes and systems disclosed herein will enjoy applicability to a wide variety of additional manufacturing, diagnostic, and developmental processes utilizing glass melts. Although the methodology of the present disclosure has applicability to a variety of glass compositions, we have recognized that the need for effective glass mixing and fining processes is particularly acute in the context of specialty glasses, such as photovoltaic glasses, LCD glasses, consumer electronics glasses, high purity fused silica glasses, and specialty glasses manufactured and sold under the Corning Incorporated trade names Eagle XG® glass and Gorilla® glass.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
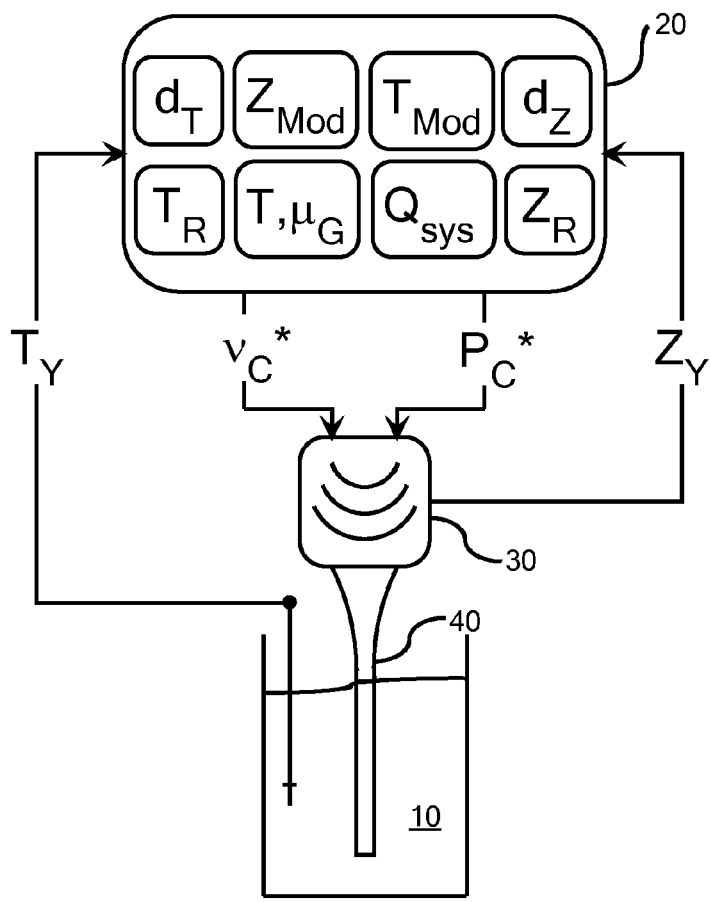
FIG. 1 is a schematic illustration of a system and method as disclosed herein for applying ultrasonic acoustic energy to a glass melt.

The system and methodology of the present disclosure can be described with initial reference to FIG. 1, which is a schematic illustration of a system for applying ultrasonic acoustic energy to a glass melt 10. The system comprises an ultrasonic power supply 20, an ultrasonic transducer 30, and an ultrasonic probe 40. The ultrasonic power supply is programmed to monitor a glass melt temperature $T_Y$ with the aid of one or more temperature sensors 50 and to transfer ultrasonic acoustic energy from the ultrasonic transducer 30, through the ultrasonic probe 40, to the glass melt 10 at a controller power $P_C$ and a controller frequency $v_C$. The following description addresses the manner in which the controller power $P_C$ and controller frequency $v_C$ are controlled. The following description also introduces examples of ultrasonic probe assemblies that can be employed in the system and methodology disclosed herein. It is noted that the power and frequency control schemes contemplated herein are not limited to use with any specific types of hardware.

Figure 3:
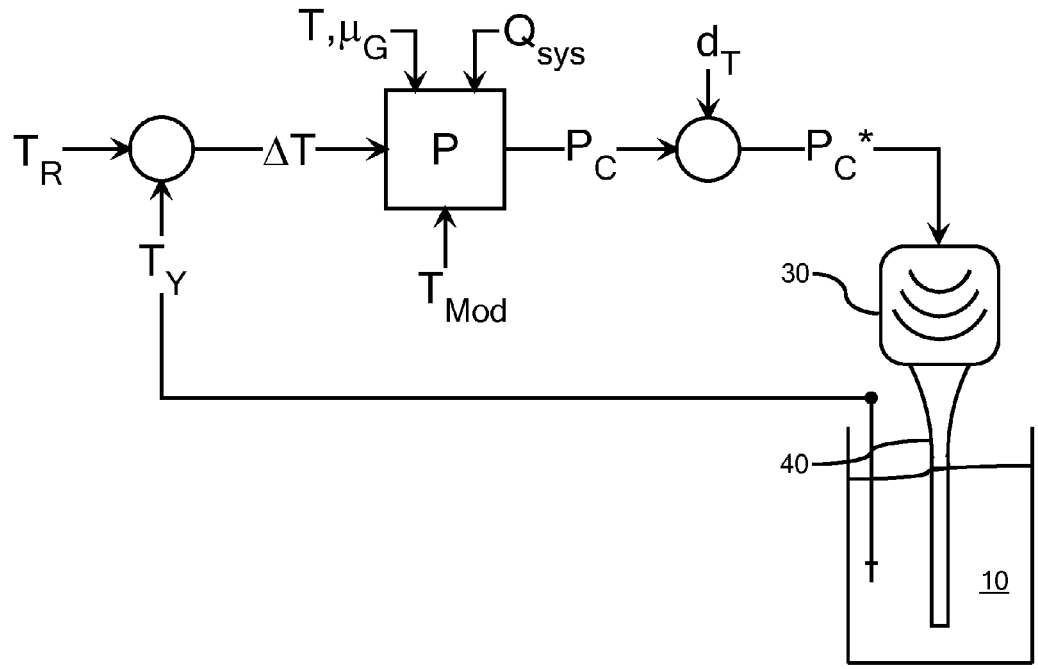
FIG. 3 is a schematic illustration of a method as disclosed herein for controlling acoustic power when applying ultrasonic acoustic energy to a glass melt.

According to the methodology of the present disclosure, the controller power $P_C$ is controlled in response to at least (i) the monitored glass melt temperature $T_Y$ and (ii) a reference glass melt temperature $T_R$. FIG. 3, which is discussed in further detail below, can be read in conjunction with FIG. 1 to illustrate various aspects of power control contemplated herein. It is noted that reference herein to a parameter being "controlled" is intended to cover a variety of parameter control conditions including, but not limited to, conditions where a parameter is established, determined, adjusted, maintained, etc. In addition, reference to a parameter being controlled "in response to" particular data is intended to cover a variety of uses of the data including, but not limited to instances where the parameter is a direct or indirect function of the data or, more broadly, where the parameter is somehow influenced by the data.

Figure 2:
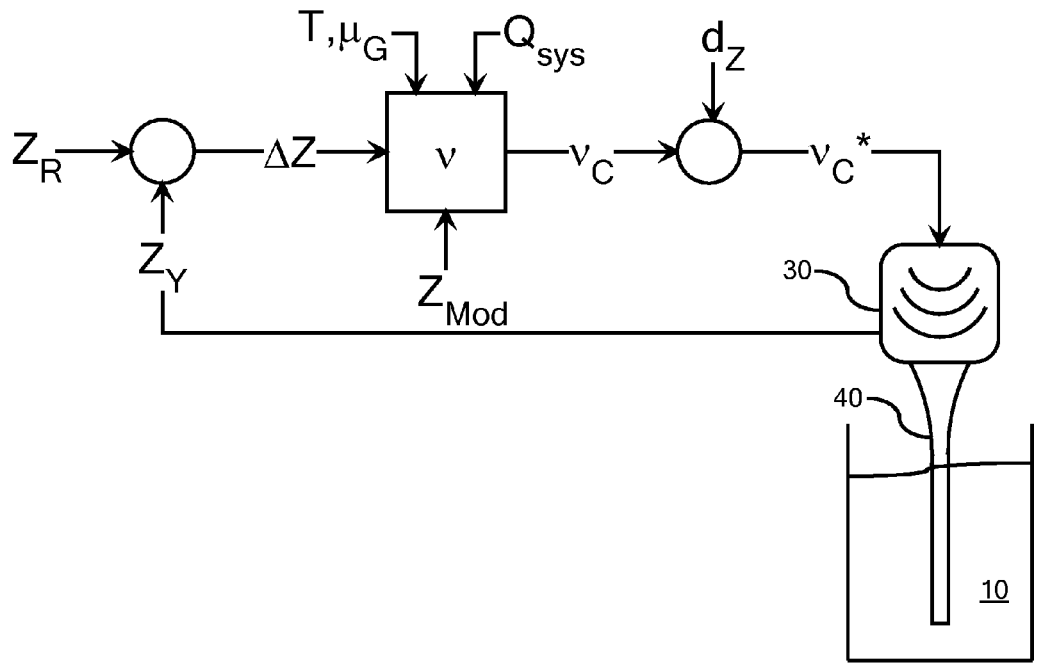
FIG. 2 is a schematic illustration of a method as disclosed herein for controlling ultrasonic frequency when applying ultrasonic acoustic energy to a glass melt.

FIG. 1 can be read in conjunction with FIG. 2 to illustrate various aspects of frequency control contemplated herein. More specifically, the controller frequency $v_C$ is controlled in response to at least (i) one or more input parameters from a temperature-viscosity curve T, $\mu_G$ characterizing the glass melt 10, (ii) one or more input parameters from one or more temperature dependent impedance response models of the glass melt 10, and (iii) $\Delta Z$, where $\Delta Z$ represents a degree to which an impedance condition $Z_Y$ of the ultrasonic probe 40 differs from a reference impedance $Z_R$ when the ultrasonic probe 40 is positioned in the glass melt 10. The controller frequency $v_C$ is selected for condition-specific glass melt treatment and typically lies between approximately 15 kHz and approximately 30 kHz. The input parameters from the temperature-viscosity curve characterizing the glass melt may comprise a single viscosity value, multiple viscosity values, a viscosity range, or combinations thereof. It is noted that the phrase "condition-specific glass melt treatment" is introduced herein to refer to treatment conditions where optimal process benchmarks are established by the user of the system.

Figure 4:
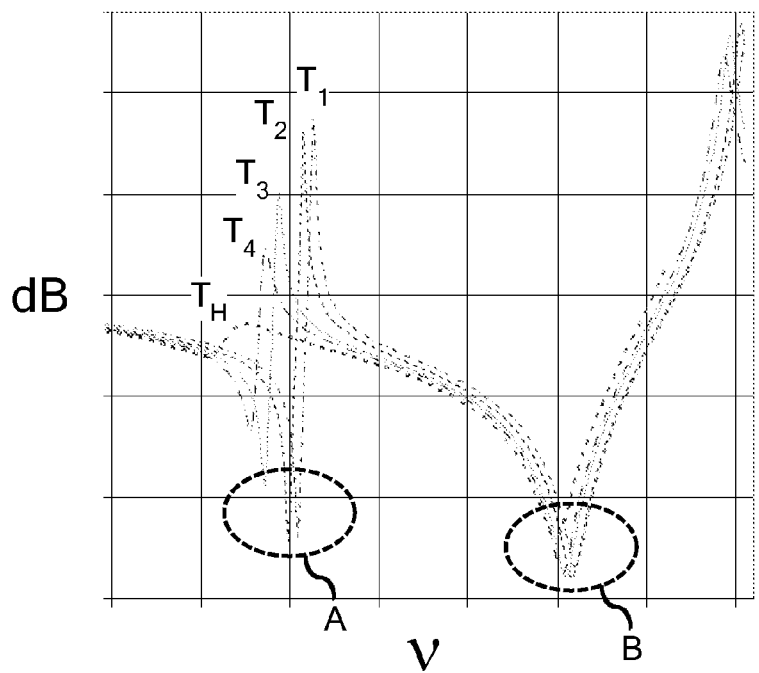
FIG. 4 illustrates modeled temperature dependent impedance responses of a glass melt.

From a broad perspective, the input parameters from the impedance response models of the glass melt represent a selected resonance of the ultrasonic probe in the glass melt and are used for relatively coarse control of the controller frequency $v_C$. For example, FIG. 4 illustrates a set of temperature dependent impedance response models for an ultrasonic probe at room temperature $T_1$ and successively higher temperatures $T_2$, $T_3$, $T_4$ in a glass melt. We have recognized that these types of impedance response models can be used to identify resonance troughs that are relatively highly damped as temperature increases (see trough A) and resonance troughs that are relatively minimally damped as temperature increases (see trough B). To optimize performance, the temperature dependent impedance response models can be used to generate input parameters for the controller frequency $v_C$ that identify the frequency characteristics of the relatively minimally damped resonance trough. For example, referring to the specific models illustrated in FIG. 4, the modeled impedance responses illustrate primary A and secondary B low-impedance resonance troughs for the ultrasonic probe in the glass melt. Because the secondary troughs exhibit minimal temperature-dependent damping, the input parameters used for the controller frequency $v_C$ will identify the frequency characteristics of the secondary low-impedance resonance trough B. The input parameters can identify a frequency range because they can be used for coarse control but it is contemplated that the input parameters may comprise a single ultrasonic frequency value, multiple ultrasonic frequency values, an ultrasonic frequency range, or combinations thereof.

Returning specifically to FIGS. 1 and 2, for fine control of the controller frequency $v_C$, reference can be made to $\Delta Z$, which represents a degree to which the impedance condition $Z_Y$ of the ultrasonic probe 40 differs from the reference impedance $Z_R$ when the ultrasonic probe 40 is positioned in the glass melt 10. $\Delta Z$ can also be taken as a representation of the power factor of the ultrasonic probe 40 in the glass melt 10 because the transducer impedance represents the phase difference between the control voltage and current of the ultrasonic probe. More specifically, the impedance condition $Z_Y$ of the ultrasonic probe 40 is determined from measurements of electrical current I flowing through the transducer assembly and a voltage drop V across the transducer assembly. $\Delta Z$ can be a direct comparison of the impedance condition $Z_Y$ of the ultrasonic probe and the reference impedance $Z_R$ when the ultrasonic probe is positioned in the glass melt. For optimal glass melt treatment, the reference impedance $Z_R$ is selected for as sharp a resonance as possible and will typically correspond to a particular frequency range, which depends on the temperature and glass viscosity. Typical frequency ranges will fall between approximately 15 kHz and approximately 30 kHz.

Generally, the control objective associated with controlling the frequency $v_C$ is the delivery of maximum or condition-specific optimal power to the glass melt under variable system impedance. In some embodiments, this objective will be of primary importance during start-up/warm-up melt processing. Because glass melt properties vary significantly depending upon the composition of the glass, the condition-specific optimal power can be derived from the temperature-viscosity curve characterizing the glass melt. In many cases, the condition-specific optimal power will be above approximately 200 W. It is noted that the phrase "condition-specific optimal power" is introduced herein to cover situations where the controller frequency $v_C$ is controlled to deliver an optimal amount of power to the glass melt, under specifications established by the user of the system, with the understanding that the optimal power may or may not be maximum power.

It is contemplated that the controller frequency $v_C$ can be further controlled in response to a heat loss parameter $Q_{SYS}$, representing an amount of heat lost in the glass melt, or a process disturbance parameter $d_Z$ representing process disturbances that directly or indirectly affect $\Delta Z$. These parameters are illustrated schematically in FIGS. 1 and 2.

The control objective associated with controlling the controller power $P_C$ is the maintenance of glass temperature at a condition-specific optimal level under variable system thermal conditions. In some embodiments, this objective will be of primary importance after start-up/warm-up melt processing. For example, the controller power $P_C$ can be controlled to maintain glass temperature at an optimal level for glass fining processes, e.g., above approximately 1000° C. Because glass melt properties vary significantly depending upon the composition of the glass, the optimal level of the glass temperature can be derived from the temperature-viscosity curve characterizing the glass melt.

Referring specifically to FIGS. 1 and 3, it is contemplated that the controller power $P_C$ can be controlled in response to $\Delta T$, where $\Delta T$ represents a degree to which the monitored glass melt temperature $T_Y$ differs from the reference glass melt temperature $T_R$. The controller power $P_C$ can be additionally controlled in response to one or more input parameters from one or more temperature models of the glass melt. The temperature models make take a variety of forms but will generally represent the relationship between input power and glass temperature.

The monitored glass melt temperature $T_Y$ can be determined from single or multiple simultaneous temperature measurements in the glass melt. $\Delta T$ can be a direct comparison of the monitored glass melt temperature $T_Y$ and the reference glass melt temperature $T_R$. Because glass properties and treatment requirements vary significantly from one glass composition to another, the reference glass melt temperature $T_R$ can be selected according to condition-specific glass melt treatments and in some embodiments lies between approximately 800° C. and approximately 1700° C., with the understanding that more likely temperature ranges will fall between approximately 1000° C. and approximately 1650° C. In any case, the monitored glass melt temperature $T_Y$ and the reference glass melt temperature $T_R$ may comprise single temperature values, a range of temperature values, or a representation of temperature profile.

It is contemplated that the controller power $P_C$ can be further controlled in response to a process disturbance parameter $d_T$ representing process disturbances that directly or indirectly affect ΔT. This parameter is illustrated schematically in FIGS. 1 and 3.

Figure 5:
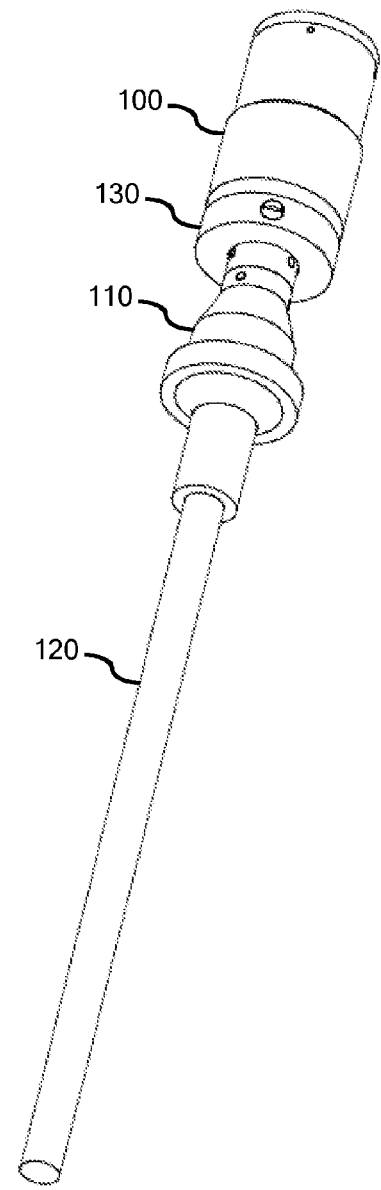
FIG. 5 illustrates an ultrasonic probe assembly including one or more features of the present disclosure.
Figure 6:
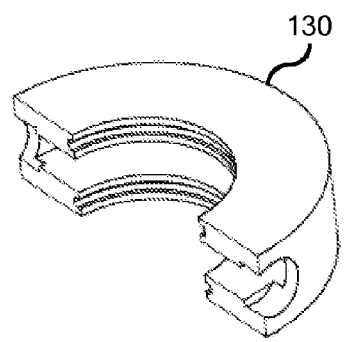
FIG. 6 is a cross sectional illustration of a booster cooling unit according to the present disclosure.
Figure 7:
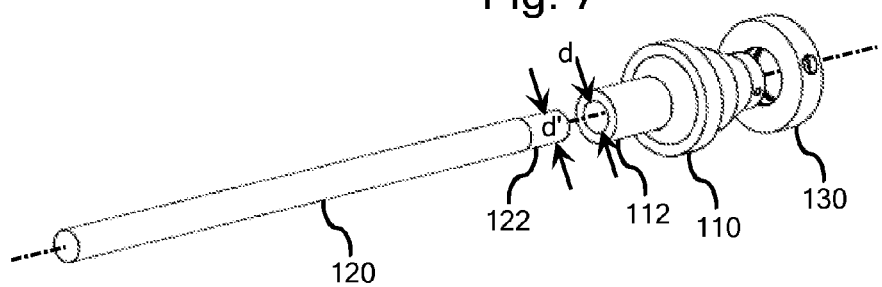
FIG. 7 is a partially exploded view of a portion of the ultrasonic probe assembly illustrated in FIG. 5.

As we note above, the methodology of the present disclosure may be executed with a variety of transducer and probe configurations. Nevertheless, FIGS. 5-7 illustrate design components of a class of suitable ultrasonic transducer assemblies. In FIGS. 5-7, the assembly comprises an ultrasonic transducer 100, an ultrasonic booster 110, an ultrasonic probe 120, and a booster cooling unit 130. The ultrasonic transducer 100 generates acoustic energy at frequencies above approximately 15 kHz. The ultrasonic booster 110 amplifies acoustic energy generated by the ultrasonic transducer 100 and transfers the amplified acoustic energy to the ultrasonic probe 120.

A seated end 122 of the ultrasonic probe 120 is positioned in a probe seat 112 of the ultrasonic booster 110. The seated end 122 of the ultrasonic probe 120 can have a slightly reduced circumference relative to the rest of the probe surface to aid in the probe seating operation. The booster cooling unit 130 is positioned to regulate the temperature of the probe seat 112 of the ultrasonic booster 110 such that the assembly supports a temperature dependent press-fit engagement of the seated end 122 of the ultrasonic probe 120 and the probe seat 112 of the ultrasonic booster 110. The temperature dependent press-fit engagement is such that the seated end 122 of the ultrasonic probe 120 can be reversibly moved in and out of the probe seat 112 when the probe seat 112 of the ultrasonic booster 110 is at an elevated temperature $T_{HOT}$. The seated end 122 of the ultrasonic probe 120 can be fixed in the probe seat 112 at room temperature $T_{COLD}$, which is defined broadly herein as any temperature between approximately 0° C. and approximately 100° because of the significantly higher temperatures associated with glass melts. The following relationship holds for the elevated temperature $T_{HOT}$ and room temperature $T_{COLD}$:

$$T_{COLD} \leq 100° C.$$

$$T_{HOT} - T_{COLD} \leq 300° C.$$

In operation, the booster cooling unit 130 helps maintain the temperature of the probe seat 112 well below $T_{HOT}$, e.g., lower than approximately 50° C., to ensure that the seated end 122 of the probe 120 remains fixed in the probe seat 112 of the ultrasonic booster 110. The resulting assembly is secure enough to avoid the use of threaded elements and adhesives in the assembly. The reference herein to "reversible" movement of the seated end 122 of the ultrasonic probe 120 in and out of the probe seat 112 is intended to include unimpeded or unobstructed movement of the probe 120 and to exclude movement that would result in damage to the probe 120 or otherwise interfere with its functionality.

More specifically, as is illustrated in FIG. 7, the ultrasonic booster 110 comprises a probe seat defining a probe seating dimension d and the geometry of the seated end 122 of the ultrasonic probe 120 is such that the ultrasonic probe defines a complementary seating dimension d' supporting a press-fit engagement of the seated end 122 of the ultrasonic probe 120 and the probe seat 112 of the ultrasonic booster 110. In the illustrated case, the dimensions are diametrical but is contemplated that the probe 120 and booster 110 may define a variety of alternative geometries. It is also noted that the particular scale of the dimensions may vary from embodiment to embodiment, depending upon the requirements of the glass melting operation at hand.

The ultrasonic booster 110 is characterized by a coefficient of thermal expansion that is sufficient for expansion of the probe seating dimension d from a seating dimension $d_{COLD}$ at room temperature $T_{COLD}$ (less than 100° C.) to a seating dimension $d_{HOT}$ at an elevated temperature $T_{HOT}$. The probe seating dimension d of the ultrasonic booster and the complementary seating dimension d' of the seated end 122 of the ultrasonic probe 120 can be configured to approximate the following relation to help ensure the above noted reversibility and secure seating:

$$d_{COLD} \leq d' \leq d_{HOT}.$$

It is noted that the relation is "approximated" in the sense that the complementary seating dimension d' may be slightly less than the seating dimension $d_{COLD}$ or slightly greater than the seating dimension $d_{HOT}$, as long as the aforementioned secure seating at room temperature $T_{COLD}$ and reversible movement at the elevated temperature $T_{HOT}$ is achieved.

Figure 8:
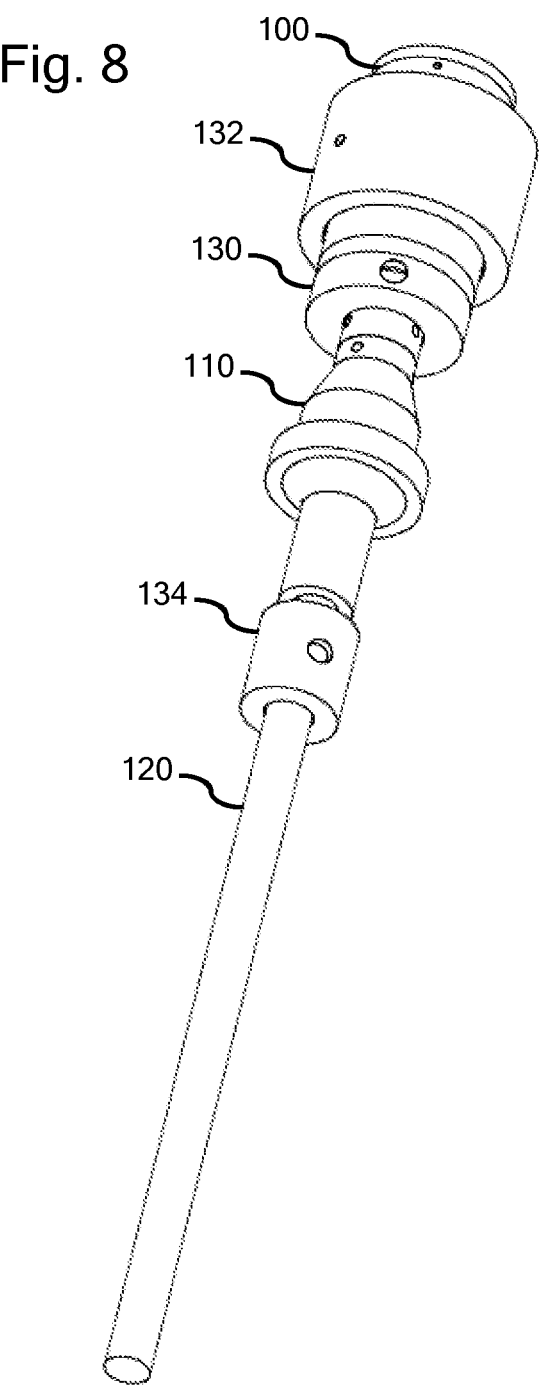
FIG. 8 illustrates an alternative ultrasonic probe assembly including one or more features of the present disclosure.

In the illustrated embodiment, the booster cooling unit 130 comprises a fluid cooling jacket surrounding a portion of the ultrasonic booster 110 or a component of the assembly thermally coupled thereto, i.e., a portion of the transducer 100 coupled to the booster 110. The booster cooling unit is illustrated in cross section in FIG. 6 and may be configured in a variety of alternative ways to regulate the temperature of the ultrasonic booster. As is illustrated in FIG. 8, contemplated transducer assemblies may be provided with additional cooling units 132, 134 thermally coupled to the ultrasonic probe 120 or the ultrasonic transducer 100 to contribute to temperature regulation throughout the assembly.

It is contemplated that the ultrasonic transducer 100, the ultrasonic booster 110, the ultrasonic probe 120, and the booster cooling unit 130 can be conveniently assembled as a rigid, mechanically coupled assembly. In some embodiments, the ultrasonic transducer assembly is configured for operation above 200 W and above 1000° C.

The ultrasonic booster may comprise a Ti alloy ultrasonic booster and the ultrasonic probe may comprise a single wavelength probe or a multi-wavelength probe fabricated from alumina or molybdenum. In the case of molybdenum, in some embodiments the probe is provided with an inner gas purging fixture to prevent oxidation of the ultrasonic probe in the glass melt.

By way of illustration and not limitation, it is noted that the transducer assembly may comprise an alumina waveguide tightly fitted to a modified ultrasonic booster made with a titanium alloy. An example of a tight shrink fit is an OD 20 mm rod with a U7 shaft, h6 tolerance hole. The ceramic rod is inserted into the booster using conductive heating, i.e., heating the bottom end of the booster to 200~300° C. The rod is then press fit with an overlap of approximately 1 inch. Cooling of the booster hot end to room temperature would then create a tight fit. The same concept and design could be used to make probe-booster pairs of different sizes.

It is noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way or to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. An ultrasonic transducer assembly comprising an ultrasonic transducer, an ultrasonic booster, an ultrasonic probe, and a booster cooling unit, wherein:
   the ultrasonic transducer generates acoustic energy at frequencies above approximately 15 kHz;
   the ultrasonic booster is connected to the ultrasonic transducer to amplify acoustic energy generated by the ultrasonic transducer and transfer the amplified acoustic energy to the ultrasonic probe;
   a seated end of the ultrasonic probe is positioned in a probe seat of the ultrasonic booster;
   the booster cooling unit is positioned to regulate the temperature of the probe seat of the ultrasonic booster such that the assembly supports a temperature dependent press-fit engagement of the seated end of the ultrasonic probe and the probe seat of the ultrasonic booster; and
   the temperature dependent press-fit engagement is such that the seated end of the ultrasonic probe can be reversibly moved in and out of the probe seat at an elevated temperature $T_{HOT}$ and is fixed in the probe seat at room temperature $T_{COLD}$, wherein $T_{COLD} \leq 100° C.$ $T_{HOT} - T_{COLD} \leq 300° C.$ 2. The ultrasonic transducer assembly of claim 1 wherein the booster cooling unit comprises a fluid cooling jacket surrounding a portion of the ultrasonic booster or a component of the assembly thermally coupled thereto.

3. The ultrasonic transducer assembly of claim 1 wherein the transducer assembly comprises an additional cooling unit thermally coupled to the ultrasonic probe.

4. The ultrasonic transducer assembly of claim 1 wherein the transducer assembly comprises an additional cooling unit thermally coupled to the ultrasonic transducer.

5. The ultrasonic transducer assembly of claim 1 wherein the ultrasonic transducer, the ultrasonic booster, the ultrasonic probe, and the booster cooling unit are assembled as a rigid, mechanically coupled assembly.

6. The ultrasonic transducer assembly of claim 1 wherein the ultrasonic transducer assembly is configured for operation above 200 W and above 1000° C.

7. The ultrasonic transducer assembly of claim 1 wherein the ultrasonic booster comprises a Ti alloy ultrasonic booster.

8. The ultrasonic transducer assembly of claim 1 wherein the seated end of the ultrasonic probe and the probe seat of the ultrasonic booster are thread-free.

9. The ultrasonic transducer assembly of claim 1 wherein the seated end of the ultrasonic probe and the probe seat of the ultrasonic booster are adhesive-free.

10. The ultrasonic transducer assembly of claim 1 wherein the ultrasonic probe comprises a single wavelength alumina probe.

11. The ultrasonic transducer assembly of claim 1 wherein the ultrasonic probe comprises a multi-wavelength molybdenum probe.

12. The ultrasonic transducer assembly of claim 1 wherein a controller frequency $v_C$ lies between approximately 15 kHz and approximately 30 kHz.

13. The ultrasonic transducer assembly of claim 1 wherein:
   the ultrasonic transducer assembly further comprises an ultrasonic power supply;
   the ultrasonic power supply is programmed to monitor a glass melt temperature $T_Y$ of a glass melt and to transfer ultrasonic acoustic energy from the ultrasonic transducer to the glass melt at a controller power $P_C$ and at a controller frequency $v_C$ through the ultrasonic probe positioned in the glass melt;
   the controller power $P_C$ is controlled in response to at least (i) the monitored glass melt temperature $T_Y$ and (ii) a reference glass melt temperature $T_R$;
   the controller frequency $v_C$ is controlled in response to at least (i) one or more input parameters from a temperature-viscosity curve characterizing the glass melt, (ii) one or more input parameters from one or more temperature dependent impedance response models of the glass melt, and (iii) $\Delta Z$, where $\Delta Z$ represents a degree to which an impedance condition $Z_Y$ of the ultrasonic probe differs from a reference impedance $Z_R$ when the ultrasonic probe is positioned in the glass melt.

14. An ultrasonic transducer assembly comprising an ultrasonic transducer, an ultrasonic booster, an ultrasonic probe, and a booster cooling unit, wherein:
   the ultrasonic transducer generates acoustic energy at frequencies above approximately 15 kHz;
   the ultrasonic booster amplifies acoustic energy generated by the ultrasonic transducer and transfers the amplified acoustic energy to the ultrasonic probe;
   the ultrasonic booster comprises a probe seat defining a probe seating dimension d;
   the booster cooling unit is positioned to regulate the temperature of the probe seat of the ultrasonic booster;

the ultrasonic probe extends from a seated end positioned in the probe seat of the ultrasonic booster to a leading end of the ultrasonic probe;

the geometry of the seated end of the ultrasonic probe is such that the ultrasonic probe defines a complementary seating dimension d' supporting a press-fit engagement of the seated end of the ultrasonic probe and the probe seat of the ultrasonic booster; and the ultrasonic booster is characterized by a coefficient of thermal expansion that is sufficient for expansion of the probe seating dimension d from a seating dimension $d_{COLD}$ at room temperature $T_{COLD}$ to a seating dimension $d_{HOT}$ at an elevated temperature $T_{HOT}$ where the seating dimensions $d_{COLD}$ and $d_{HOT}$ and the complementary seating dimension d' approximate the following relation $$d_{COLD} \leq d' \leq d_{HOT}$$

and the respective temperatures approximate the following relations $$T_{COLD} \leq 100° C.$$

$$T_{HOT} - T_{COLD} \leq 300° C.$$

* * * * *